United States Patent
Babish et al.

(10) Patent No.: US 6,257,517 B1
(45) Date of Patent: Jul. 10, 2001

(54) METHOD AND APPARATUS FOR FEEDING WELDING WIRE

(75) Inventors: Francis Stephen Babish, Clarks Summit; Michael Edward Sandherr, Factoryville, both of PA (US)

(73) Assignee: Sandvik Steel Co., Clarks Summit, PA (US)

( * ) Notice: Subject to any disclaimer, the term of this patent is extended or adjusted under 35 U.S.C. 154(b) by 0 days.

(21) Appl. No.: 09/371,532

(22) Filed: Aug. 10, 1999

(51) Int. Cl.$^7$ ..................................... B65H 51/02
(52) U.S. Cl. .............. 242/365.6; 242/366; 242/564.3; 242/564.4; 242/566; 242/615.2; 242/157 R; 226/190; 72/183
(58) Field of Search ................ 242/365.6, 366, 242/366.1, 564.3, 564.4, 566, 157 R, 615.2; 226/190; 72/183

(56) References Cited

U.S. PATENT DOCUMENTS

| | | |
|---|---|---|
| 2,186,106 | 1/1940 | Hargreaves et al. . |
| 2,668,510 * | 2/1954 | Mally ............................. 242/365.6 X |
| 3,018,975 * | 1/1962 | Kulicke, Jr. ....................... 242/564.3 |
| 3,282,304 * | 11/1966 | Coleman ............................... 242/566 |
| 3,360,212 | 12/1967 | Frisch . |
| 3,365,139 | 1/1968 | Wheatley et al. . |
| 3,879,978 * | 4/1975 | Harris, Jr. ............................. 72/183 |
| 4,114,822 | 9/1978 | Jacobsson . |
| 4,434,925 * | 3/1984 | Jacobs ......................... 242/564.4 X |
| 4,944,464 * | 7/1990 | Zelenka ............................. 242/564.4 |
| 5,370,290 * | 12/1994 | Gilliland ........................ 226/190 X |
| 5,836,539 * | 11/1998 | Grimm et al. .................. 242/157 X |
| 6,027,068 * | 2/2000 | Lantsman ......................... 242/564.4 |

FOREIGN PATENT DOCUMENTS

477023 * 5/1975 (AU) ................................ 242/564.4

* cited by examiner

*Primary Examiner*—Donald P. Walsh
*Assistant Examiner*—Minh-Chau Pham
(74) *Attorney, Agent, or Firm*—Burns, Doane, Swecker & Mathis, LLP

(57) ABSTRACT

A welding wire feeding system feeds welding wire from a barrel to a welding gun. The system includes a feed mechanism for drawing welding wire from the barrel and advancing the welding wire toward the welding gun. A free-wheeling wheel is disposed between the barrel and the feed mechanism and is freely rotatable about an axis. The welding wire is wound around the wheel, whereby a curvature is imparted to an otherwise-straight welding wire. Also, any twists generated in the welding wire at the welding gun will be stopped at the wheel before reaching and fouling the barrel.

10 Claims, 2 Drawing Sheets

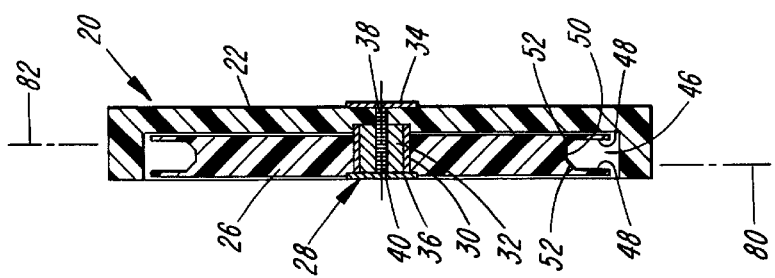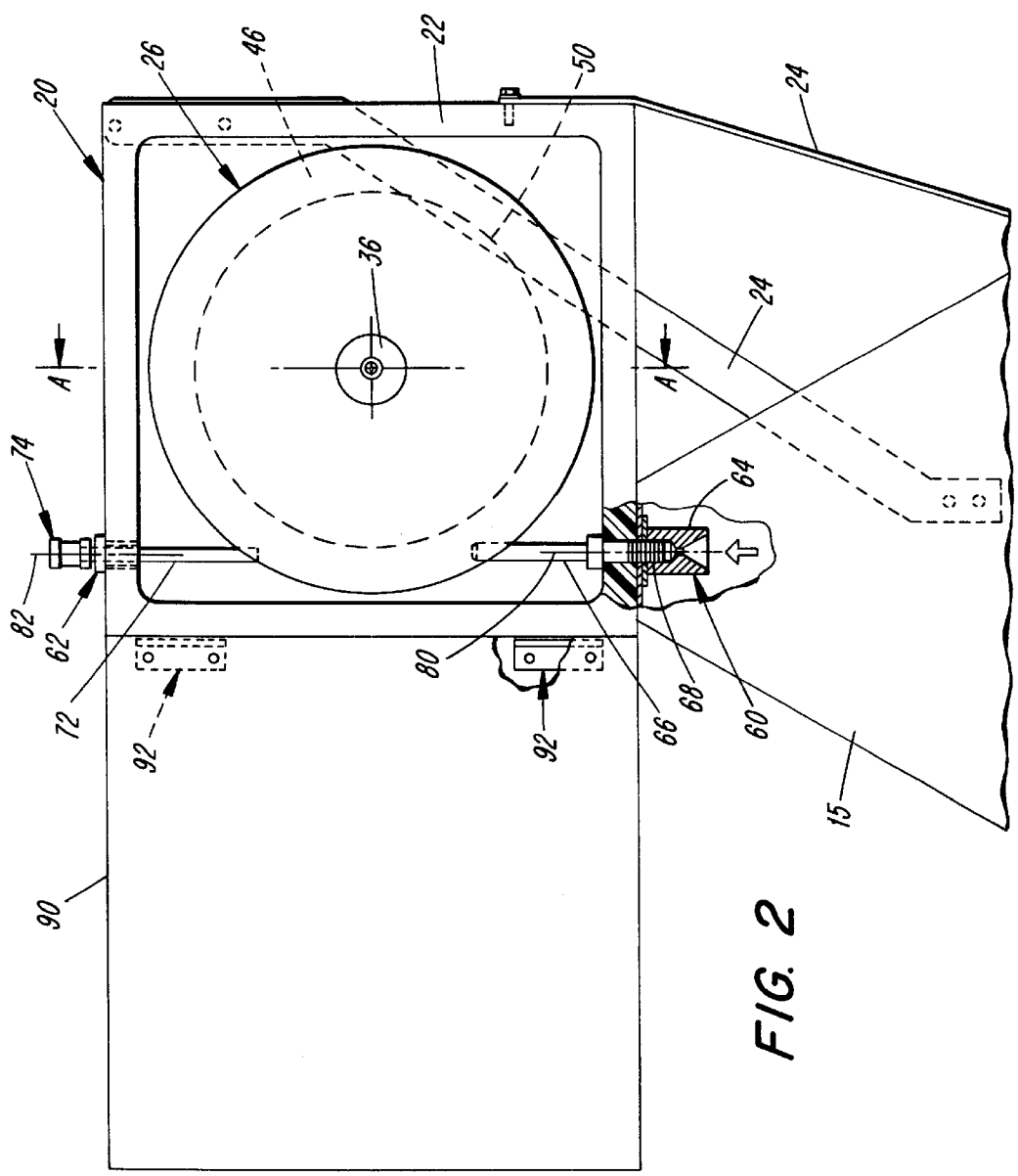

METHOD AND APPARATUS FOR FEEDING WELDING WIRE

BACKGROUND OF THE INVENTION

The present invention relates to the feeding of welding wire electrode from a drum package to a welding gun.

A typical welding system utilizing a welding gun includes a source of welding wire arranged, for example, in spools, reels, or drums, and a feed mechanism which includes a pair of drive rolls for feeding the welding wire to the welding gun. Certain types of welding guns require that the welding wire maintain constant contact with a contact tip disposed at a discharge end of the welding gun. Otherwise, the welding wire becomes fed without being melted and, upon abutting against the workpiece, causes a tangling of the welding wire to occur at the feed rollers. This condition is known in the industry as bird nesting. In certain automated welding systems, a loss of contact between the welding wire and the contact tip can cause the system to shut down, resulting in a rejected unit or a unit requiring rework.

Loss of contact between the welding wire and the contact tip can occur, for example in straight-necked welding guns where a welding wire that has little or no inherent curvature may pass coaxially through the outlet of the welding gun without making contact with the tip. This problem does not occur in cases where the welding wire is extracted from a spool on which the wire is wound, because wire extracted from spools has an inherent curvature and thus will exit the welding gun in contact with a side (i.e., electrode) of the outlet. That is, a wire with curvature is physically incapable of exiting the outlet in coaxial relationship therewith. In cases where the wire is stored in a cylindrical barrel (drum), however, the wire has little or no inherent curvature, and a loss of contact with the electrode of a straight-neck welding gun can occur.

On the other hand, much more wire can be stored in barrels, than on spools, so a welding system using barrel-stored welding wire can operate for much longer periods before the system must be shut down to replace the welding wire.

Therefore, it would be desirable to enable welding wire to be supplied from a barrel without a risk that the welding wire will lose contact with a contact tip located at the outlet of a welding gun, such as a straight-neck welding gun.

Another problem can occur in welding operations utilizing a robotic welding gun which is subjected to a type of movement which causes a twist to be created in the welding wire. That twist can be transmitted back to the source of welding wire, such as a barrel, causing the welding wire to become knotted within the barrel.

Therefore, it would also be desirable to prevent a twist from being transmitted through the welding wire all the way to the source of welding wire.

SUMMARY OF THE INVENTION

The present invention relates to a welding wire feeding apparatus adapted to feed welding wire from within a barrel to an electronic welding gun. The apparatus comprises a payoff mechanism for extracting welding wire from the barrel and advancing the welding wire toward the welding gun. A free-wheeling wheel is mounted on a housing for free rotation between the barrel and the feed mechanism. The wheel is free rotatable about an axis, and the welding wire is wound around the wheel.

As a result, a curvature is imparted to an otherwise-straight welding wire to ensure that the welding wire makes contact with the electrode of a straight necked welding gun. Also, in the event that a twist is imparted to the welding wire during the use of a robotic welding gun, that twist will not be able to be transmitted all the way to the barrel.

In addition the mechanism is built into a enclosed system preventing external debris from accumulating and contaminating the welding wire.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 2 is a side elevational view of a freely rotatable wheel according to the present invention;

FIG. 3 is a vertical sectional view taken through the wheel depicted in FIG. 2.

DETAILED DESCRIPTION OF A PREFERRED EMBODIMENT OF THE INVENTION

Figure 1:
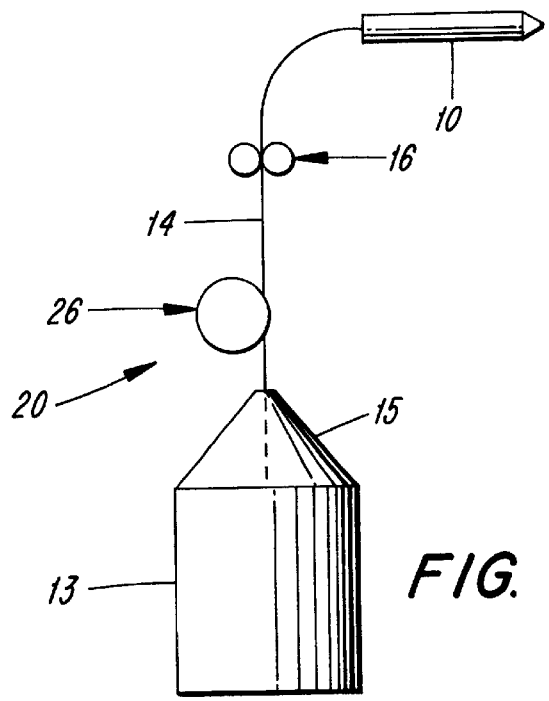
FIG. 1 is a schematic depiction of a welding system according to the present invention.

A welding system schematically depicted in FIG. 1 comprises a conventional welding gun 10 (e.g., a straight-necked welding gun), a conventional wire storage device comprising a cylindrical barrel 13, a conventional wire-guiding cone 15 mounted on top of the barrel 13, a conventional feeding device 16 comprising of drive rollers for feeding the welding wire 14 to the welding gun 10, and an apparatus 20 according to the present invention placed between the cone 15 and the feeding device 16 (FIG. 1) for preventing any twist in the welding wire from being transmitted from the welding gun to the barrel, and for imparting a curvature to the welding wire.

Figure 3A:
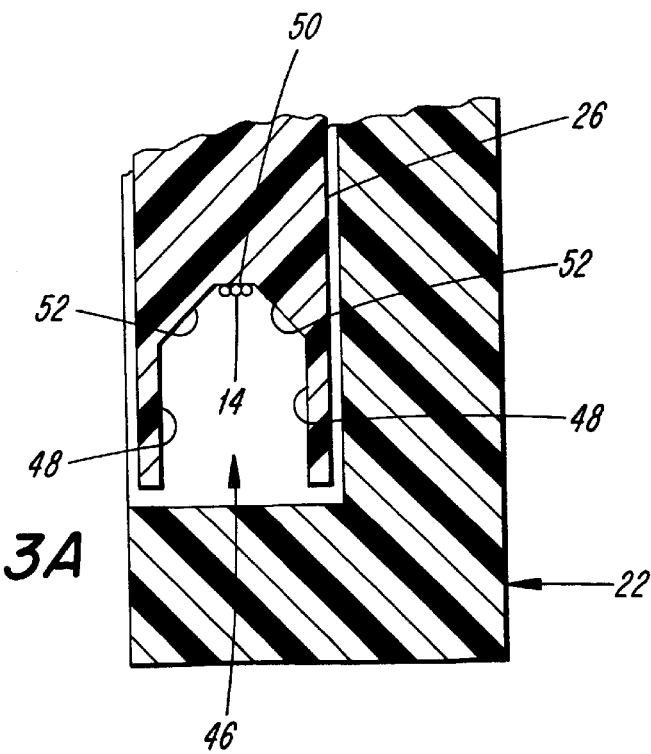
FIG. 3A is an enlargement of a fragment of the wheel depicted in FIG. 3.

The apparatus 20, depicted in FIGS. 2–4 comprises a housing 22 attached preferably to the cone 15 by brackets 24 so as to overlie an upper end of the barrel. Mounted on the housing is a freely rotatable wheel 26 rotatable about a horizontal axis by means of a bearing assembly 28. That bearing assembly 28 comprises a cylindrical bushing 30 (e.g., made of bronze) disposed in a central through-hole of the wheel, a spool arbor 32 extending within the bushing, a pair of spool washers 34, 36, and a pair of screws 38, 40. One of the spool washers 34 is disposed on an external surface of the housing 22, and the other spool washer 36 is disposed in an axial counterbore formed in the wheel 26. The screws 38, 40 pass through respective ones of the washers 34, 36 and are threaded centrally in the spool arbor 32. The wheel 26 and the bushing 30 are freely rotatable together on the spool arbor 32.

An annular groove 46 is formed in the outer circumferential surface of the wheel 26. The groove includes axially spaced radial side walls 48, a bottom wall 50, and a pair of inclined guide walls 52 interconnecting respective side walls 48 with the bottom wall 50 for guiding the welding wire toward the bottom wall as will be explained.

Mounted on the housing are a wire inlet guide 60, and a wire outlet guide 62. The inlet guide 60 comprises a guide cone 64 attached to the housing by means of a hollow inlet guide tube 66 which has a threaded end 68 threadedly connected within a central bore of the guide cone. The guide cone includes a wire entrance passage that flares outwardly in a downward direction.

The outlet guide 62 comprises an outlet guide tube 72 of similar configuration to the inlet guide tube 66 and threadedly connected to a hollow bushing 74.

An axis 80 of the inlet guide tube 66 is offset from an axis 82 of the outlet guide tube 72 in a direction parallel to the axis of rotation of the wheel 26 as shown in FIG. 3. Each of those axes 80, 82 passes through the groove 46 of the wheel at a location near a respective axial end thereof and generally tangentially relative to the bottom wall 50 as can be seen in FIG. 3.

The housing 22 is provided with a door 90 mounted by hinges 92 so as to be swingable between open and closed positions in order to provide access to the wheel 26, or enclose the wheel. By enclosing the wheel, external debris will not be able to accumulate on, and thereby contaminate, the welding wire.

The housing 22 and the wheel 26 can be formed of any suitable non-conductive material such as plastic.

In operation, welding wire is drawn upwardly from within the barrel 13, and travels through the cone 15 and the wire inlet guide 60, and is then wound helically a number of turns, e.g., three or four turns, around the wheel 26 within the groove 46. The wire then exits the apparatus 20 through the wire outlet guide 62, and travels to the feeding device 16 and then to the welding gun 10.

Welding wire stored in a typical barrel 13 has relatively little, if any, curvature imparted thereto. Thus, the wire exiting the barrel possesses little, if any, curvature. The floor 50 of the wheel groove 46 has a sufficiently small diameter (e.g., about 8 inches in one tested model) to impart a curvature to the welding wire traveling therearound. Thus, after traveling around the wheel 26, a curvature is imparted to the wire which ensures that the wire, as it eventually exits the straight-necked welding gun, will make continuous contact with the electrode, whereby there will occur no interruption in the melting of the wire.

In the event that the welding gun, whether it be a straight-necked gun or some other type, undergoes a motion (e.g., repeated 360° rotation) during the welding operation causing a twist to be imparted to the wire being fed, that twist will not be able to travel all the way back to the barrel and foul the barrel, because the twist will be stopped at the wheel 26.

It will thus be appreciated that the present invention ensures that a welding wire maintains continuous contact with an electrode situated at an exit of a straight-necked electric welding gun, and also prevents a twist formed in the wire at a welding gun from fouling the wire in the barrel.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A welding wire feeding system adapted to feed welding wire from within a barrel to a welding gun, comprising:
   a barrel containing welding wire there within;
   a feed mechanism for drawing welding wire from the barrel and advancing the welding wire toward the welding gun;
   a housing; and
   a free-wheeling wheel mounted for free rotation on the housing and disposed between the barrel and the feed mechanism and being freely rotatable about an axis, the welding wire being withdrawn from said barrel, wound at least one complete turn around the wheel and extending to a contact tip of the welding gun, wherein the wheel imparts a twist to the welding wire.

2. The apparatus according to claim 1 wherein the housing includes an inlet guide opening for guiding the welding wire toward the wheel, and an outlet guide for guiding the welding wire away from the wheel, the inlet and outlet guide being offset from one another in a direction parallel to the axis.

3. The apparatus according to claim 2 wherein the welding wire is wound a plurality of times around the wheel.

4. The apparatus according to claim 1 wherein the wheel includes a cylindrical bottom surface and beveled side converging radially inwardly toward the bottom surface.

5. The apparatus according to claim 1 wherein the wheel is disposed over the barrel.

6. The apparatus according to claim 1 wherein the feed mechanism comprises driven rollers.

7. The apparatus according to claim 1 wherein the wheel is oriented such that the axis is horizontal.

8. A welding system comprising:
   a welding gun;
   a barrel containing welding wire, the barrel including a guide cone at its upper end;
   a feed mechanism for drawing welding wire from the barrel and advancing the welding wire toward the welding gun, wherein the welding wire extends from the barrel to a contact tip of the welding gun;
   a housing mounted to the barrel and including a wire inlet guide and a wire outlet guide;
   a free-wheeling wheel mounted for free rotation about a horizontal axis on the housing and disposed between the barrel and the feed mechanism, the wheel situated over the cone and including a groove formed in an outer peripheral surface of the wheel;
   the welding wire passing through the inlet guide, wound at least one complete turn around the groove of the free-wheeling wheel, and then passing through the outlet guide, whereby a curvature is imparted to the welding wire.

9. A method of conducting welding wire from a barrel to a welding gun during a welding operation, comprising the steps of:
   A) actuating a drive mechanism for drawing the welding wire from the barrel and advancing the welding wire into contact with a contact tip of the welding gun during a welding operation;
   B) passing the welding wire at least one complete turn around a freely-rotating wheel during step A after the welding wire has been drawn from the barrel and before the welding wire has reached the feeding mechanism, wherein the wheel imparts a curvature to the weld wire and prevents twists created in the welding wire at the welding gun from being transmitted to the barrel.

10. The method according to claim 9, wherein step B comprises passing the welding wire a plurality of complete turns around the freely-rotating wheel.

* * * * *